United States Patent [19]

Leipnitz

[11] Patent Number: 4,534,022

[45] Date of Patent: Aug. 6, 1985

[54] PHONOGRAPH PICK-UP WITH IMPROVED SHIELD GROUNDING

[76] Inventor: Michael Leipnitz, Am Eichenquast 37, 1000 Berlin 47, Fed. Rep. of Germany

[21] Appl. No.: 517,112

[22] Filed: Jul. 25, 1983

[30] Foreign Application Priority Data

Jul. 29, 1982 [DE] Fed. Rep. of Germany ....... 3228299

[51] Int. Cl.³ ........................ G11B 3/02; H04R 11/12

[52] U.S. Cl. ................................ 369/170; 174/35 R; 174/51; 339/14 R; 339/143 R; 369/136; 369/146; 369/256

[58] Field of Search ............... 369/256, 170, 135, 129, 369/164, 162, 136, 146, 148, 149, 147; 174/51, 35 R; 339/14 R, 143 R

[56] References Cited

U.S. PATENT DOCUMENTS

| | | | |
|---|---|---|---|
| 3,062,925 | 10/1962 | Pritchard | 369/149 |
| 3,146,319 | 8/1964 | Stanton | 369/136 |
| 3,297,831 | 1/1967 | Stanton | 369/149 |
| 3,404,895 | 10/1968 | Hathaway | 369/256 |
| 4,031,335 | 6/1977 | Smit | 369/146 |
| 4,381,129 | 4/1983 | Krenz | 339/14 R |

FOREIGN PATENT DOCUMENTS

| | | | |
|---|---|---|---|
| 864306 | 3/1961 | United Kingdom . | |
| 1061740 | 4/1967 | United Kingdom | 369/136 |

*Primary Examiner*—Steven L. Stephan

[57] ABSTRACT

A grounding technique for a screening shell of a phonograph cartridge. A connector pin is offset with respect to other pins of the cartridge so as to be in direct contact with one of the walls of the shell.

4 Claims, 7 Drawing Figures

PHONOGRAPH PICK-UP WITH IMPROVED SHIELD GROUNDING

BACKGROUND OF THE INVENTION

The invention relates to a pick-up head for reading information from the groove of a rotating information-carrier disc by means of a stylus which scans the groove. Such a pick-up head for a phonograph typically comprises a pick-up cartridge which is secured to a carrying member. The cartridge comprises an electromagnetic system with coils and pole pieces, surrounded by a screening shell . The cartridge is energized via connector pins to which the coils are connected.

Such a pick-up head is disclosed in, for example, German Auslegeschrift No. 25 12 467, to which U.S. Pat. No. 4,031,335 corresponds. The magnetic system comprises two pole rods on which cylindrical coils are arranged. The ends of the pole rods which are situated within the magnetic field are U-shaped and are arranged adjacent each other as pole pieces opposite a third pole piece formed by the screening shell. A stylus mounted in an elastic suspension block is located in the magnetic field between the two pole-rod ends and the pole piece formed by the shell. A permanent or soft-magnetic transducer element is arranged on the stylus.

SUMMARY OF THE INVENTION

Other known constructions employ four pole pieces. It is the object of the invention to construct a pick-up head of the type mentioned in the opening paragraph so that it is easier to mount and cheaper.

According to the invention this object is achieved in that one of the connector pins is arranged at an offset location so that it is in direct metallic contact with the screening shell.

This contact can be obtained in that the connector pin is deformed by the screening shell when the screening shell is slid onto the system. In this way soldered joints and connecting leads may be dispensed with.

An embodiment of the invention will now be described in more detail, by way of example, with reference to the drawings.

DESCRIPTION OF THE PREFERRED EMBODIMENT

Figures 1, 2, 3:
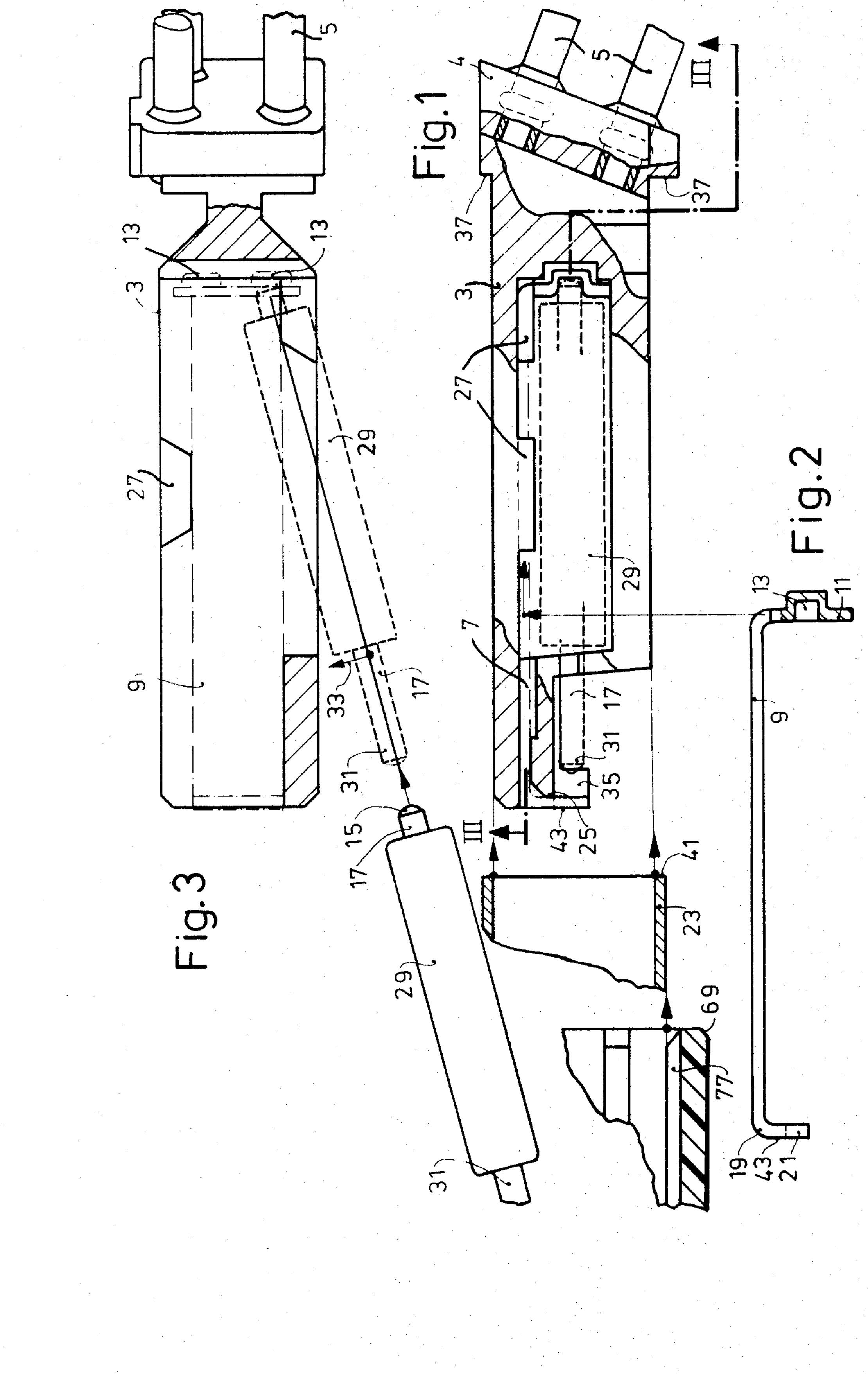
FIG. 1 is a side view, partly in section, of a mount of a pick-up head the central part on and around which the pick-up system is arranged, with a screening shell and a stylus holder ready to be slid onto the mount.
FIG. 2 is a sectional view of a flux-return member which controls the magnetic flux between the backward pole-rod ends and the third pole piece.
FIG. 3 is an exploded view partly in section showing how the pole rods with the coils are inserted into the mount.

The central part of the pick-up head is formed by an elongate slender mount 3. The mount 3 is an injection-moulded plastic part in whose base 4 four connector pins 5 are molded. The mount 3 is constructed so that the magnet system of the pick-up head with the scanning stylus can be fitted into and around it. The mount 3 is formed with a guide slot 7 into which a flux-return member 9 as shown in FIGS. 2 and 3 can be fitted. The flux-return member may for example be a mu-metal part.

The rearward bent limbs 11 of the flux-return member 9 shown in FIG. 2 has recesses 13 for engagement with the rearward ends 15 of pole rods 17. At the flux end 19 the flux-return member 9 also has a bent limb 21, by means of which the contact with a screening shell 23 (FIGS. 1 and 4) is established, as will be explained hereinafter.

The flux-return member 9 shown in FIG. 2 is fitted into the guide slot 7 in the position relative to the mount 3 as shown in FIG. 1, namely from a location above the plane of drawing into this plane. After this the member 9 is shifted to the right in the guide slot 7 until it abuts a stop 25 of the mount 3 in the dash-dot position (FIG. 1). The flux-return member 9 is prevented from dropping sideways out of the mount by edge portions 27.

When the member 9 is in the position shown in FIG. 2 the pole rods 17 with their coils 29 are fitted into the mount 3. The pole rods 17 are straight mu-metal rods without flanges on which the coils 27 are arranged. In FIG. 3 the position of the member 9 in the mount 3 is again indicated by a dash-dot line. The pole rods 17 are fitted into the recess 13 with the ends 15 rearward. Subsequently, the field-sensing ends 31 of the pole rods 17 are fitted into the mount in the direction indicated by an arrow 33. The filed-sensing ends 31 then came into contact with oblique faces 35 on the mount 3 and are pressed into the recesses 13. After having passed the oblique face 35, the ends 31 of the pole rods 17 snap behind the oblique face 35, so that the rods 17 are fixed to the mount.

The connecting wires of the coils 29 may now be fitted into the connector pins 5 and soldered to these pins.

Pre-assembly of the mount 3 is now completed. The mount carries the flux-return member 9, the pole rods 17 and the coils 29. As is indicated in FIG. 1 a square tubular screening shell 23 is slid in a longitudinal cartridge direction onto the elongate mount 3. The shell comprises a profile-rolled strip of a suitable screening metal. The shell can be slid on until it abuts stop surfaces 37 on the FIG. 4. When the front edge 41 of the screening shell 23 abuts the stops 37, the front edge surface 43 of the flux-return member 9 also comes into metallic contact with a front bounding wall 45 of the shell 23.

Figure 4:
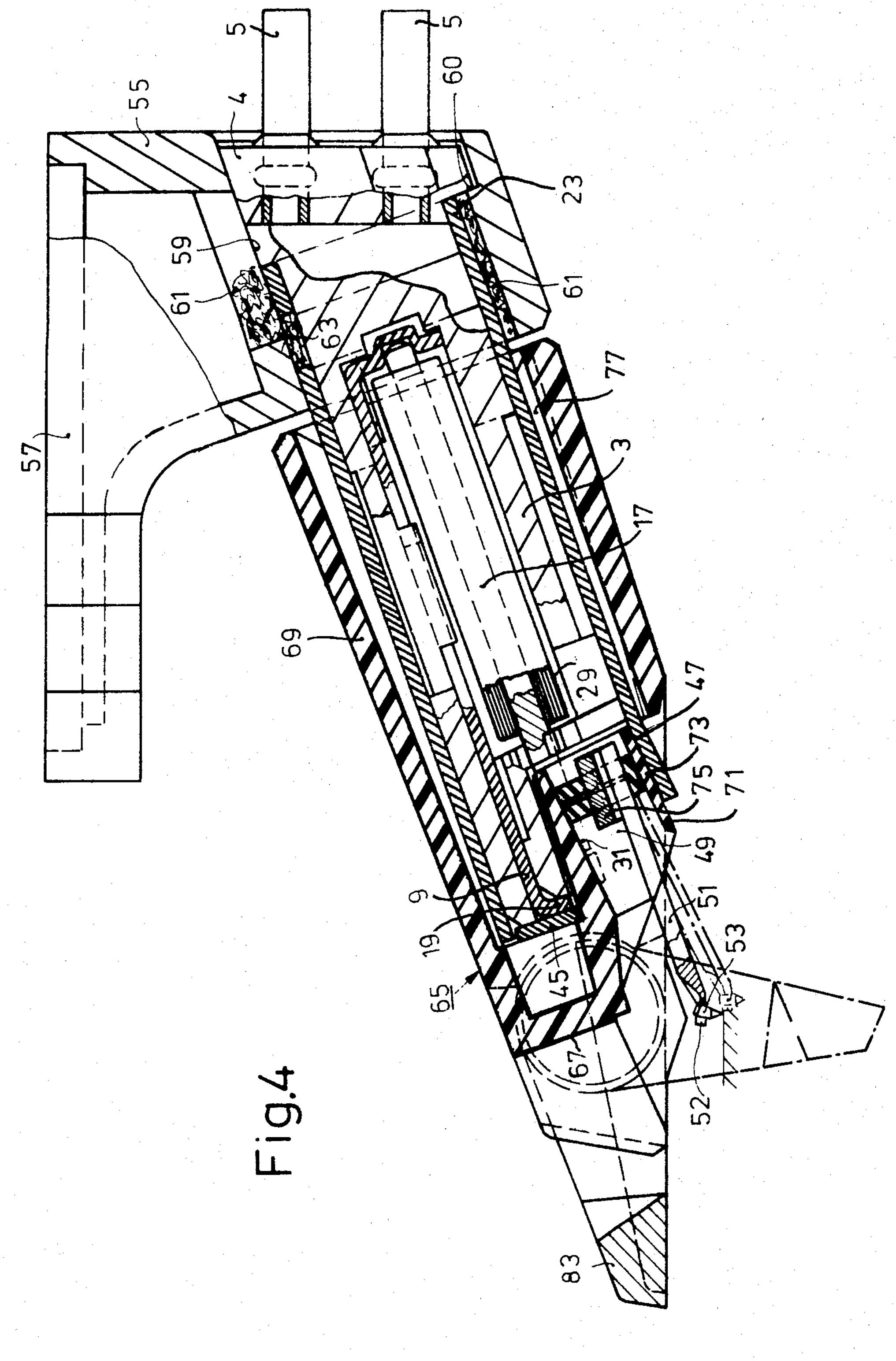
FIG. 4 is a sectional view of the pick-up head after assembly of the parts.

FIG. 4 also shows that after the shell 23 has been slid onto the pre-assembled mount 3 a screening shell surface 47 which forms the third pole piece faces the field-sensing ends 31 of the pole rods 17. The field-sensing ends 31 of the pole rods 17 form two pole pieces which each correspond to one of two orthogonal directions of oscillation. Thus, an electromagnetic energizing field 49 is formed into which the stylus support 51 is arranged. At its free front end 52 the suspension block 51 carries the stylus 53.

For connection to a phonograph pick-up arm, the pre-assembled mount 3 is fitted into a carrying member 55. This carrying member 55 with a standard connector base 57 is formed with a receptacle 59. The mount 3 is slid , front wall 45 first into the receptacle 59 from the rear. The sliding movement is limited by a stop 60 on the base of the carrying member 55. The receptacle 59 has an annular opening 61 through which the mount 3 with the shell 23 extends. The shell 23 also has an opening 63, which extends up to the location of the opening 61. After the correct insertion of the mount 3 into the carrying member 55 an adhesive is applied in the opening 61, which flows around this opening and into the opening 63. In this way the mount 3 together with the screening shell 63 is firmly secured to the carrying member 55.

The stylus unit 65 comprises the stylus support 51 and a stylus holder 67. On a holder sleeve 69 which can be slid onto the shell 23 the stylus holder 67 carries a tubular portion 71 of square cross-section. this portion 71 receives an elastomeric suspension block 73 in which the stylus support 51 with the stylus 53 and the magnet 75 are secured.

Figure 5:
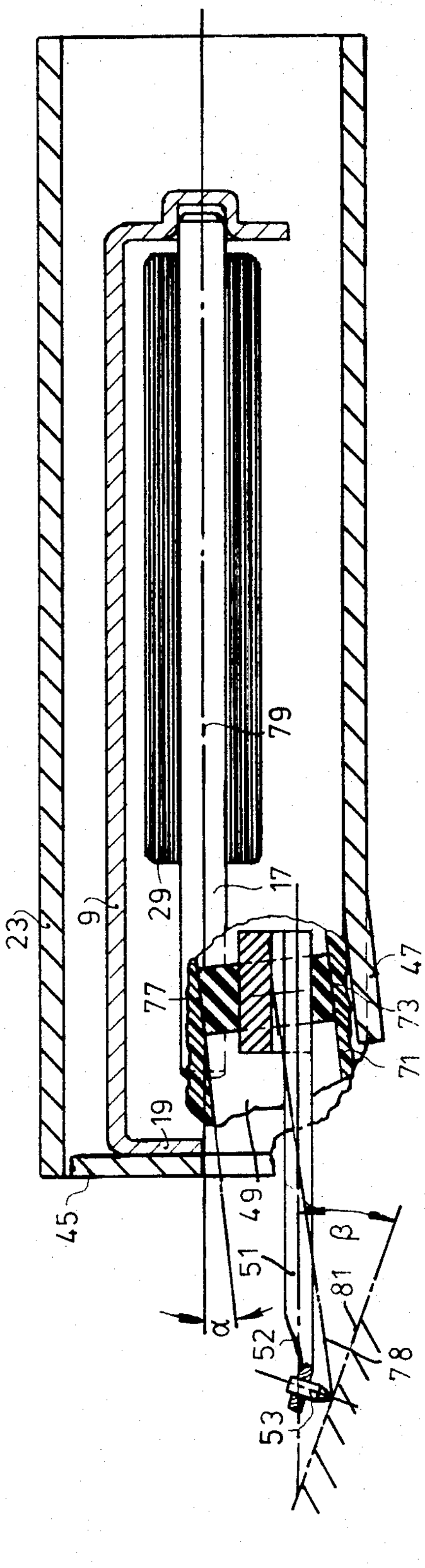
FIG. 5 is a sectional view on an enlarged scale of an eccentric stylus suspension for the embodiment of FIGS. 1-4, and FIGS. 6 and 7 are side and end views of a direct contact between a connector pin and the screening shell.

The tubular portion 71 is disposed at an angle $\alpha$ relative to the axis 79 of the pick-up head, represented by the pole piece 17, the flux-return member 98 and the screening shell 23 in FIG. 5. The angle $\alpha$ has been selected so that when the stylus 53 is placed on an informaion-carrier disc 81 the prescribed tracking angle $\beta$ is obtained. This enables the elastomeric suspension block 73 to be made axially symmetric, while maintaining an asymmetric arrangement in the electro-magnetic field 49 between the pole pieces 31 and 47 which provides improved cross-talk attenuation.

The stylus holder 67 is fixed to the mount 3 (see also FIG. 1 at the extreme left) by sliding it onto the screening shell 23. Projections 77 on the inner side of the holder sleeve 69 firmly retain the sleeve 69 on the shell 23. When the stylus holder 67 has been slid on fully, the tubular portion 71 has moved the stylus support 53 into the field 49 between the pole-pieces of the pole rods 17 and the surface 47 of the screening shell 23. The system is then ready for operation.

A protective cap 83 may be attached to the stylus holder 67, which can be slid over the stylus 53 with its diamond tip 79 in the same way as a visor.

Figure 6:
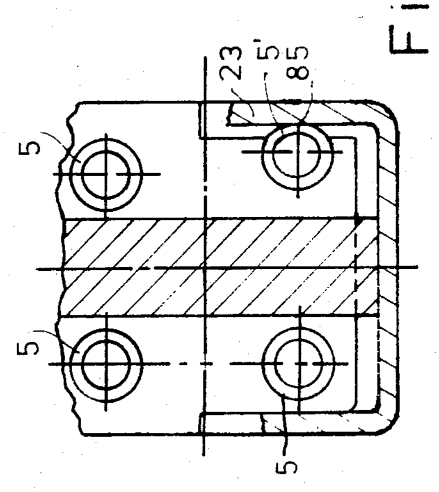
Figure 7:
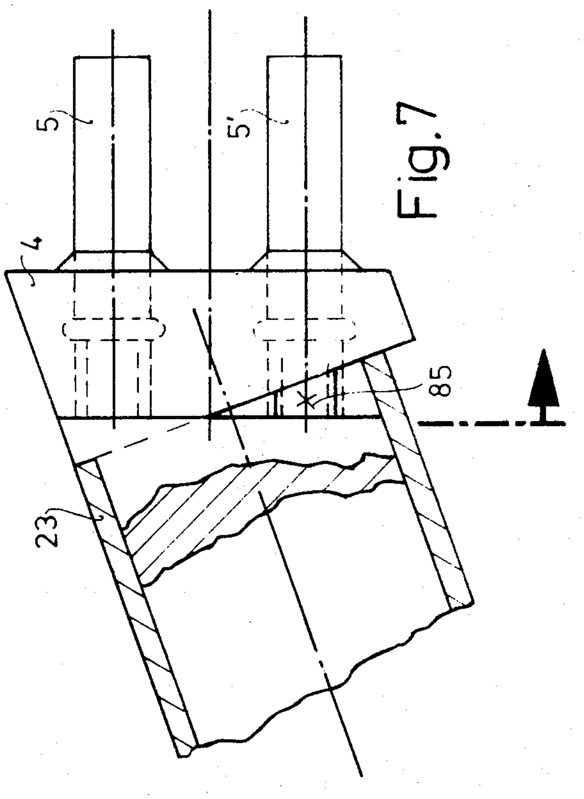

FIGS. 6 and 7 show a simple method of forming the earth contact with a connector pin 5'. This connector pin 5' is arranged at an outwardly offset location. This makes it possible to press this pin 5' onto the shell 23. At the location 85 a metallic contact is obtained with the screening cover 23 on the mount 3. Thus for obtaining the earth contact a wire connection and additional soldered joints may be dispensed with.

What is claimed is:

1. A phonograph pick-up head comprising
a carrying member,
a pick-up cartridge secured to the carrying member, and comprising a mount and an electromagnetic system having coils and pole pieces fitted to said mount, a screening shell surrounding said coils and pole pieces, and connector pins fixed to said mount and electrically connected to the coils, and
means for electrically connecting said screenig shell to one connector pin,
wherein said shell is a tubular shell having an inner surface,
said connector pins are arranged in an asymmetrical pattern, said one pin being disposed at a location offset outwardly such that said one pin is in direct metallic contact with a portion of said inner surface of said shell, and
said means consists of said direct metallic contact with said shell.

2. A head as claimed in claim 1, wherein said shell is slid over said one pin thereby deforming a portion of said one pin and making the metallic contact with said portion.

3. A phonograph pick-up head comprising
a carrying member,
a pick-up cartridge secured to the carrying member, and comprising a mount and an electromagnetic system having coils and pole pieces fitted to said mount, a screening shell having walls having inner surfaces extending in a longitudinal cartridge direction and surrounding said coils and pole pieces, and connector pins fixed to said mount and electrically connected to the coils, and
means for electrically connecting said screening shell to one connector pin,
wherein said connector pins are arranged in an asymmetrical pattern, said one pin being disposed at a location offset outwardly such that said one pin is in direct metallic contact with a portion of one of said inner surfaces, and
said means consists of said direct metallic contact with said inner surface portion.

4. a head as claimed in claim 3. wherein said shell is slid over said one pin thereby deforming a portion of said one pin and taking the metallic contact between said wall and said portion.

* * * * *

UNITED STATES PATENT AND TRADEMARK OFFICE

CERTIFICATE OF CORRECTION

PATENT NO. : 4,534,022

DATED : August 6, 1985

INVENTOR(S) : MICHAEL LEIPNITZ

It is certified that error appears in the above-identified patent and that said Letters Patent is hereby corrected as shown below:

IN THE TITLE PAGE:

THE ASSIGNEE SHOULD BE --U. S. PHILIPS CORPORATION--.

Signed and Sealed this

*Twenty-fifth* Day of *February 1986*

[SEAL]

*Attest:*

DONALD J. QUIGG

*Attesting Officer*

*Commissioner of Patents and Trademarks*